Patented May 16, 1933

1,909,218

UNITED STATES PATENT OFFICE

ROBERT NOTVEST, OF INDIANAPOLIS, INDIANA, ASSIGNOR TO J. D. ADAMS MANUFACTURING COMPANY, OF INDIANAPOLIS, INDIANA, A CORPORATION OF INDIANA

FLUX COATED WELDING ROD

No Drawing.   Application filed October 19, 1931.   Serial No. 569,865.

My invention is concerned with iron or steel electrodes for use in arc-welding, and primarily with electrodes which are provided with a coating of flux.

It is my object to provide such an electrode with a coating which will possess desirable fluxing properties, as well as other desirable characteristics, and which at the same time will materially increase the speed of welding. A further object of my invention is to produce a coating which will dry on the electrode in a short time.

The coating on a coated arc-welding electrode, as is well known, performs a number of functions in the operation of arc welding. Among such functions are the reduction of oxides which interfere with or prevent the formation of satisfactory fusion, the protection of the arc, and the formation of slag which will lie only on the surface of the weld and which will when cool be of a character such that it can readily be removed. It is also well known that the character of the coating influences the stability of the arc and the speed with which the weld is performed.

I have found that mica, finely powdered and applied to the surface of the electrode through the use of a suitable binder, forms an admirable flux-coating. An electrode to which such a coating has been applied produces a clean weld, the slag formed being very brittle and readily removable, and leaves the surface of the weld a bright white color. The speed at which molten material is deposited on the weld is materially higher than is the case with electrodes coated with any prior coating of which I am aware.

In carrying out my invention, to cite a specific example, I may mix 80 parts by weight of finely powdered mica, 15 parts by weight of potassium silicate, and 5 parts by weight of water. After these ingredients are thoroughly mixed, the uncoated electrodes, which may be of any desired composition, are immersed in it, removed, and allowed to drain and dry.

Binders other than potassium silicate can be used if desired. Sodium silicate is a binder frequently used in the application of coating to arc-welding electrodes, and it may be used in carrying out my invention. I prefer, however, to use potassium silicate, as it dries on the electrode in a very small fraction of the time required for the drying of sodium silicate. The quick-drying property of potassium silicate renders it a very desirable binder for flux-coatings including materials other than mica. In my co-pending application Serial No. 569,864, filed October 19, 1931, I have disclosed fluxing materials of an entirely different nature which are applied to the electrodes by the use of a potassium-silicate binder.

Rods coated as above described are especially adapted for use in "straight polarity" welding—i. e., in direct-current welding with the electrode connected to the negative side of the current-source.

I claim as my invention:

1. An electrode for arc-welding, said electrode having applied to it a coating comprising a mixture of approximately 80 parts by weight of powdered mica, approximately 15 parts by weight of potassium silicate, and approximately 5 parts by weight of water.

2. An electrode for arc-welding, said electrode having applied to it a coating composed principally of a mixture of powdered mica and an adhesive.

3. An electrode for arc-welding, said electrode having applied to it a coating comprising a mixture of approximately 80 parts by weight of powdered mica and approximately 20 parts by weight of an adhesive.

In witness whereof, I have hereunto set my hand at Indianapolis, Indiana, this 16th day of October, A. D. one thousand nine hundred and thirty-one.

ROBERT NOTVEST.